(12) United States Patent
Burchill

(10) Patent No.: US 8,339,293 B2
(45) Date of Patent: Dec. 25, 2012

(54) CAPACITIVE TOUCH MULTI-FUNCTION KEYS

(75) Inventor: Melissa J. Burchill, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 414 days.

(21) Appl. No.: 12/730,281

(22) Filed: Mar. 24, 2010

(65) Prior Publication Data

US 2011/0234429 A1 Sep. 29, 2011

(51) Int. Cl.
*H03M 11/00* (2006.01)
(52) U.S. Cl. ......................................................... 341/33
(58) Field of Classification Search .................... 341/33; 200/275; 361/280, 288, 303
See application file for complete search history.

(56) References Cited

U.S. PATENT DOCUMENTS

| | | | |
|---|---|---|---|
| 4,476,463 A | 10/1984 | Ng et al. | |
| 4,994,988 A * | 2/1991 | Yokoi | 358/1.13 |
| 5,305,017 A | 4/1994 | Gerpheide | |
| 5,825,352 A | 10/1998 | Bisset et al. | |
| 5,869,791 A | 2/1999 | Young | |
| 5,933,102 A | 8/1999 | Miller et al. | |
| 5,995,026 A | 11/1999 | Sellers | |
| 6,297,811 B1 | 10/2001 | Kent et al. | |
| 6,452,514 B1 | 9/2002 | Philipp | |
| 6,690,360 B2 | 2/2004 | Johnston et al. | |
| 6,885,317 B1 | 4/2005 | Gutowitz | |
| 6,949,723 B2 | 9/2005 | Staebler et al. | |
| 7,091,952 B2 | 8/2006 | Johnston et al. | |
| 7,148,704 B2 * | 12/2006 | Philipp | 324/686 |
| 7,295,190 B2 | 11/2007 | Philipp | |
| 7,423,634 B2 | 9/2008 | Amiri | |
| 7,741,858 B2 * | 6/2010 | Jeong | 324/661 |
| 8,089,288 B1 * | 1/2012 | Maharita | 324/678 |
| 2007/0079246 A1 | 4/2007 | Morillon et al. | |
| 2009/0039239 A1 | 2/2009 | Amoriza Berasaluce et al. | |

* cited by examiner

*Primary Examiner* — Brian Young
(74) *Attorney, Agent, or Firm* — Kirk W. Goodwin; Peter J. Melsa

(57) ABSTRACT

The presently described technology relates to an appliance control panel having multi-function keys. The multi-function keys have multiple regions. A control panel operation module is provided for regulating the control panel system between multiple operation input modes. When the control panel system is in one operation input mode, activation of the first key region executes a first appliance function, and activation of the second key region executes a second appliance function. When the control panel system is in another operation input mode, activation the first key region and activation of said second key region execute the same appliance function. A method for operating an appliance control panel system having multi-function keys is also disclosed.

20 Claims, 5 Drawing Sheets

CAPACITIVE TOUCH MULTI-FUNCTION KEYS

BACKGROUND OF THE INVENTION

1. Field of the Invention

The presently described technology generally relates to electrical control panels. More specifically, the presently described technology relates to capacitive touch electrical control panels for appliances.

2. Description of the Related Art

Capacitive sensors have become increasingly common and accepted for use in human interfaces and for machine control. In the field of home appliances, there can be found capacitive touch controls operable through functioning user interfaces or control panels. Touch controls, touch switches or touch pads are used to replace conventional mechanical or tactile switches. Unlike tactile or mechanical switches, touch pads contain no moving parts to break or wear out. Moreover, touch pads can be mounted or formed on a continuous substrate sheet, such as a touch panel, without the need for openings in the substrate. The use of touch pads in place of mechanical or tactile switches can therefore be advantageous, particularly in environments where contaminants are likely to be present. Touch panels are also easier to clean than typical mechanical switch panels because they can be made without openings in the substrate that would allow penetration of contaminants. As a result, touch panels can offer a unique "high end" type of control panel experience, allowing a user to activate a control panel switch by placing an item such as a stylus or a finger at an area or a key of the control panel.

In appliance control panels, it is becoming desirable to provide a visual display in conjunction with a control panel. Such a display can be in the form of a small digital screen, or a larger digital interface, such as a liquid crystal display (LCD) screen. The display can offer various modes of display in relation to the function of the control panel. For example, in one mode, a control panel display may display functions associated with adjusting the temperature of the appliance, and in another mode, the control panel display may display functions associated with the filter or dispensing characteristics of the appliance, for example. In these embodiments, it may be valuable to provide a control panel offering capacitive touch keys that operate as a single key in one mode, and as a plurality of keys in another mode.

Currently, the state of the art offers methods such as those depicted in FIG. 1. FIG. 1 depicts a "slider" type of a touch receiver pad 50. The slider touch receiver pad has an upper region 10 and a lower region 20 divided by a diagonal line 30. The slider can approximately detect where on the slider key a user is touching by the amount of capacitance associated in each region. For example, where a user touches on the left side of the slider, the user's finger will likely be primarily touching the lower slider region 20, thereby generating a capacitance signal from lower region 20 that is significantly greater than the capacitance detected from upper region 10. Thus, the slider unit approximates the touch to be on the left side of the pad. Where the capacitance signal is detected as 50% for each region, the slider can approximate that the press is in the middle of the pad.

The slider touch pads, however, require complex algorithms for determining a precise touch position. Further, slider touch pads, due to the shape of the receiving areas, may not always work where the touch receptor pads are separated from the control panel interface and the use of an extender is required.

As a result, there exists an ongoing challenge to have systems and methods for providing a control panel offering multi-function keys utilizing or interacting with extenders.

BRIEF SUMMARY OF THE INVENTION

Certain embodiments of the presently described technology present an appliance control panel system utilizing a control having multi-function keys. Each multi-function key has multiple key regions (for example, a first key region and a second key region). A control panel operation module is also provided for regulating the control panel system between multiple operation input modes. The control panel operation module may be, for example, a processor such as a computer processor for operating a software program. The operation input modes comprise at least two operation input modes. When the control panel system is in one operation input mode (for example, a first operation input mode), activation of the first key region executes a first appliance function, and activation of the second key region executes a second appliance function. That is, activation of each key region activates a unique and/or separate appliance function. The first appliance function can be a different appliance function from the second appliance function. When the control panel system is in another operation input mode (for example, a second operation input mode), activation of the first key region and activation of said second key region execute the same appliance function. For example, in the first operation input mode, a first key region may raise the appliance temperature while the second key region lowers the appliance temperature. In the second operation input mode, the first key region and the second key region both execute a dispensing of ice when activated, for example.

Certain embodiments of the presently described technology provide a method for operating an appliance control panel system. The method comprises providing a control panel interface having at least one multi-function key. The multi-function key has a plurality of key regions (for example, a first key region and a second key region). The method also includes providing a control panel operation module for regulating among, for example, a plurality of operation input modes. The control panel operation module may be, for example, a processor such as a computer processor for operating a software program. The operation input modes comprise at least two distinct operation input modes (for example, a first operation input mode and a second operation input mode). The method involves executing an appliance function when at least one key region for the multi-function key is activated, for example, by a user pressing the key.

In certain embodiments, the method involves executing appliance functions as follows. When the control panel system is in the first operation input mode, the method involves executing a first appliance function when a user activates the first key region, and executing a second appliance function when a user activates the second key region. The first appliance function can be a different appliance function from the second appliance function. When the control panel system is in a second operation input mode, the method involves executing the same appliance function upon activation of either the first key region or the second key region of the multi-function key. In other words, in the first operation mode, the multi-function key operates as more than one separate key. In the second operation mode, the multi-function key operates as a single key.

Certain embodiments of the presently described technology provide an appliance control panel system having a control panel interface. The control panel interface has at least one multi-function key, and the multi-function key has a plurality of key regions. The plurality of key regions can be a first key region and a second key region, for example. The control panel system also comprises a control panel operation module for regulating the control panel system between a plurality of operation input modes. The control panel operation module may be a processor such as a computer processor for executing a software program, for example. The operation input modes comprise multiple operation input mode such as a first operation input mode and a second operation input mode. When the control panel system is in the first operation input mode, the control panel operation module can interpret a signal indicating a user press of said first key region as a first key press and a signal indicating a press of said second key region as a user second key press. In the second operation input mode, the control panel operation module can interpret a signal indicating a user press of the first key region and a press of said second key region as a press of the same key, for example, a first key press.

DETAILED DESCRIPTION OF PREFERRED EMBODIMENTS

The presently described technology describes one or more embodiments of devices and methods for providing a control panel having touch pad keys that provide multiple functions. In certain embodiments, the presently described technology provides a capacitive touch key that is capable of operating as a single touch key in one mode, and operates as a plurality of touch keys in another mode.

In appliance control panels, it is becoming desirable to provide a visual display in conjunction with a control panel. Such a display can be in the form of a small digital screen, or a larger digital interface, such as a liquid crystal display (LCD) screen or other display. In such a situation, the control panel may be situated a certain distance away from the electronic circuitry behind the control panel to allow for the space required to accommodate the display. Accordingly, the keys or switches of the control panel may require an extender to transmit a signal when a key is pressed to the control circuitry. For example, for a tactile switch, a mechanical lever or a rigid device may span the gap between the switch with the circuit board assembly. For a touch panel, spanning this gap can be difficult for various reasons. An electrical connection that covers a larger distance may have a reduced signal to noise ratio, for example, or be open to unintended actuations due to electrical noise or other interferences affecting a touch pad or the leads extending from the touch switch to its associated control circuit.

Figure 5:
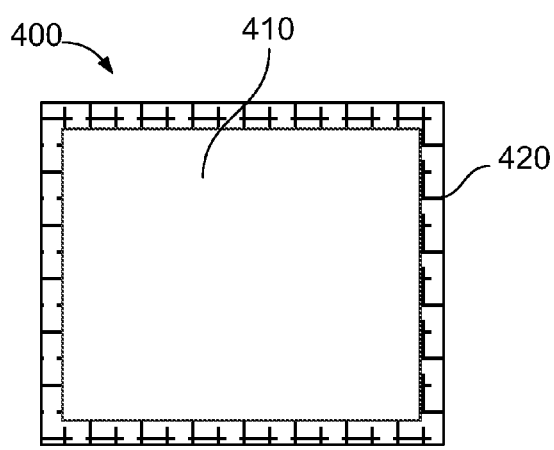
FIG. 5 depicts a top view of an extender as used in accordance with an embodiment of the presently described technology.
Figure 6:
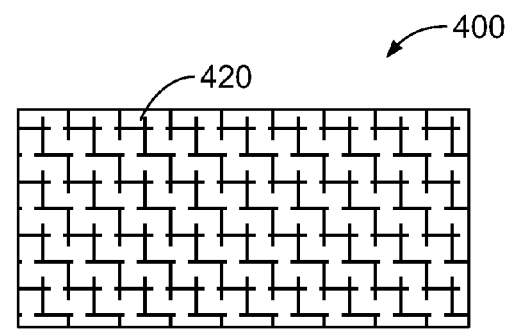
FIG. 6 depicts a front view of the extender of FIG. 5.

For certain applications of touch keys on an electronic control, it can also be desirable to have two functions for one key in one operation mode, and to have the keys perform as a single key in another mode. The presently described technology provides a system that places multiple touch pads close to each other, providing a narrow gap therebetween. In one mode the control panel distinguishes between the multiple touch pads as separate keys. When the separate keys are pressed, a control module recognizes the difference between a press of each key, and executes a control panel functionality accordingly. In another mode, the control panel recognizes the multiple touch pads as a single key. In this mode, when the user presses any of the touch pads, the control panel executes a control panel function associated with the single key. The presently described technology is capable of being used with capacitive touch extenders, which provide a conductive material placed between the capacitive touch pads on a circuit board and the plastic interface that is actually touched by a user. An exemplary embodiment of an extender 400 is depicted by FIGS. 5 and 6 and described herein.

It is understood that the term touch pad, as that term is used throughout this application refers to all forms of touch sensitive control panels that activate a switch when the presence of an object, such as a stylus or a human finger, for example, are detected. Throughout this application, the terms capacitive touch pads, touch sensors, capacitive touch sensors, touch panels, capacitive touch panels, touch keys, capacitive touch keys, touch switches, capacitive touch switches are all considered to be touch pads. The term tactile switch, as that term is used throughout this application refers to a switch, key, lever or button that is mechanically activated, such as by the press of a button or lever, such as a rocker switch, for example. Throughout this application, the terms mechanical key, tactile key, mechanical switch, mechanical button, tactile switch, tactile button or tactile panel are considered to be tactile switches. Further, the term electrical connection, or electrical continuity, as those terms are used throughout this application means any connection by which an electrical or electronic signal may be transmitted. A system can be in electrical connection, even if they are not in direct or indirect physical contact, if an electric signal can be transmitted. For example, a non-conductive layer can exist between the conductive portions of a system and the system can still be in electrical connection.

Figure 2:
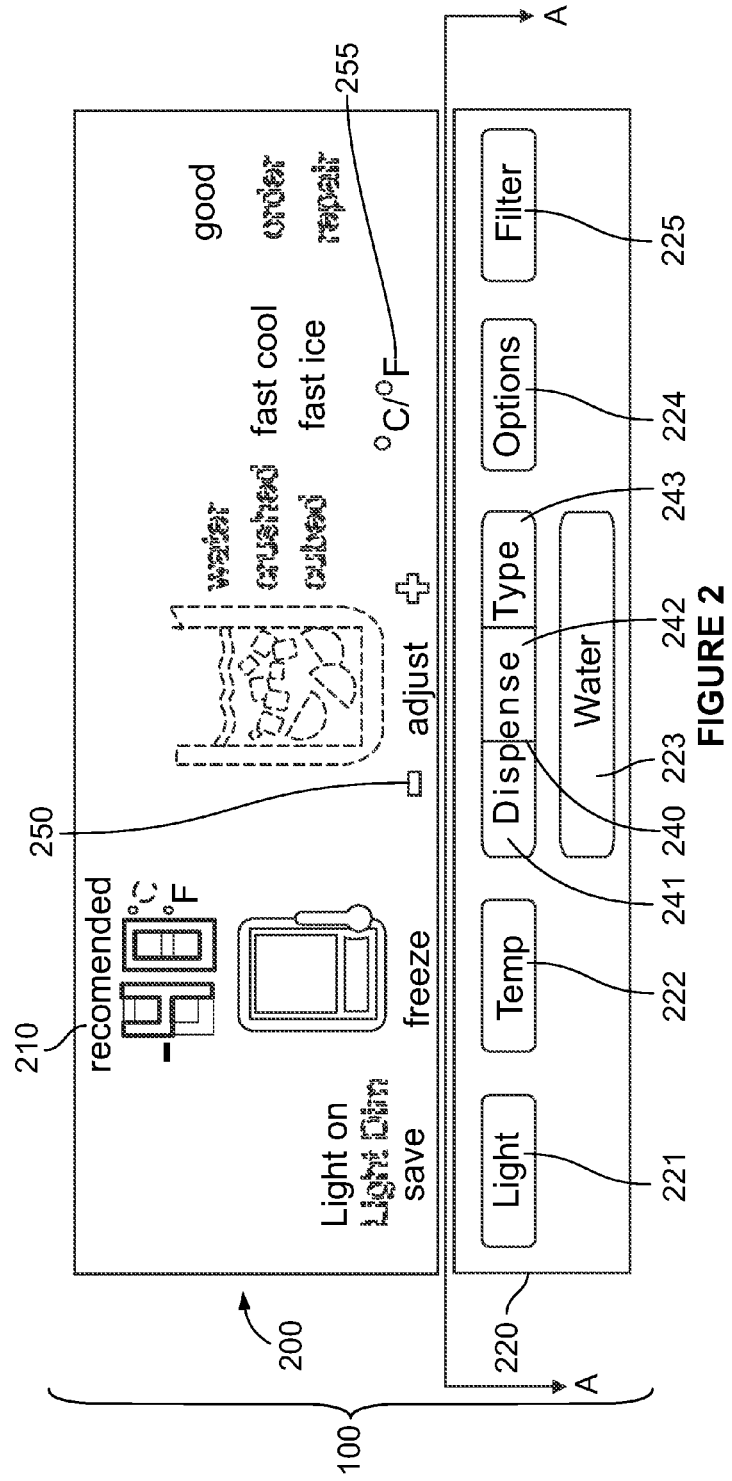
FIG. 2 depicts an example of an interface display for an appliance control panel in a certain (i.e., a first) operation input mode in accordance with an embodiment of the presently described technology.

FIG. 2 depicts an example of a control panel interface 200 for use on a refrigerator/freezer/ice maker appliance in accordance with the presently described technology; however, the interface of the presently described technology may be used in other appliances such as microwaves, stoves, ovens, dishwashers, washers, dryers, etc. A display area 210 depicts various functions provided by the appliance, such as the refrigerator temperature and the display light, as well as offering various options, such as dispensing water, crushed ice or cubed ice and other various functions. Below the display 210 is an input interface 220, comprising a plurality of keys (for example, Light 221, Temp 222, Water 223, Options 224, Filter 225 and Dispense Type 240) where a user operates the control panel. By activating one or more of the keys on the input interface 220, the user uses the control panel 100 to operate various functionalities of the appliance. Each of the various keys may provide a different control panel function, such as controlling the control panel light, the refrigerator temperature, dispensing water or ice, pulling up a list of options, or adjusting filter settings, for example.

The keys (for example, Light 221, Temp 222, Water 223, Options 224, Filter 225 and Dispense Type 240) of the input interface 220 may either be touch keys or tactile switches, depending on the embodiment of the control panel 100. In the embodiment depicted in FIG. 2, the keys are touch keys. The touch keys operate such that when an object, such as the user's finger is detected as touching the key, the key is activated, and a signal is sent to the control panel 100. For example, when the control panel 100 detects a user's finger is touching the key identified as "Light," 221 the control panel activates the functionality associated with that key 221, which may be to turn on or off the backlight to the display area 210 of the control panel interface 200, for example.

Figure 3:
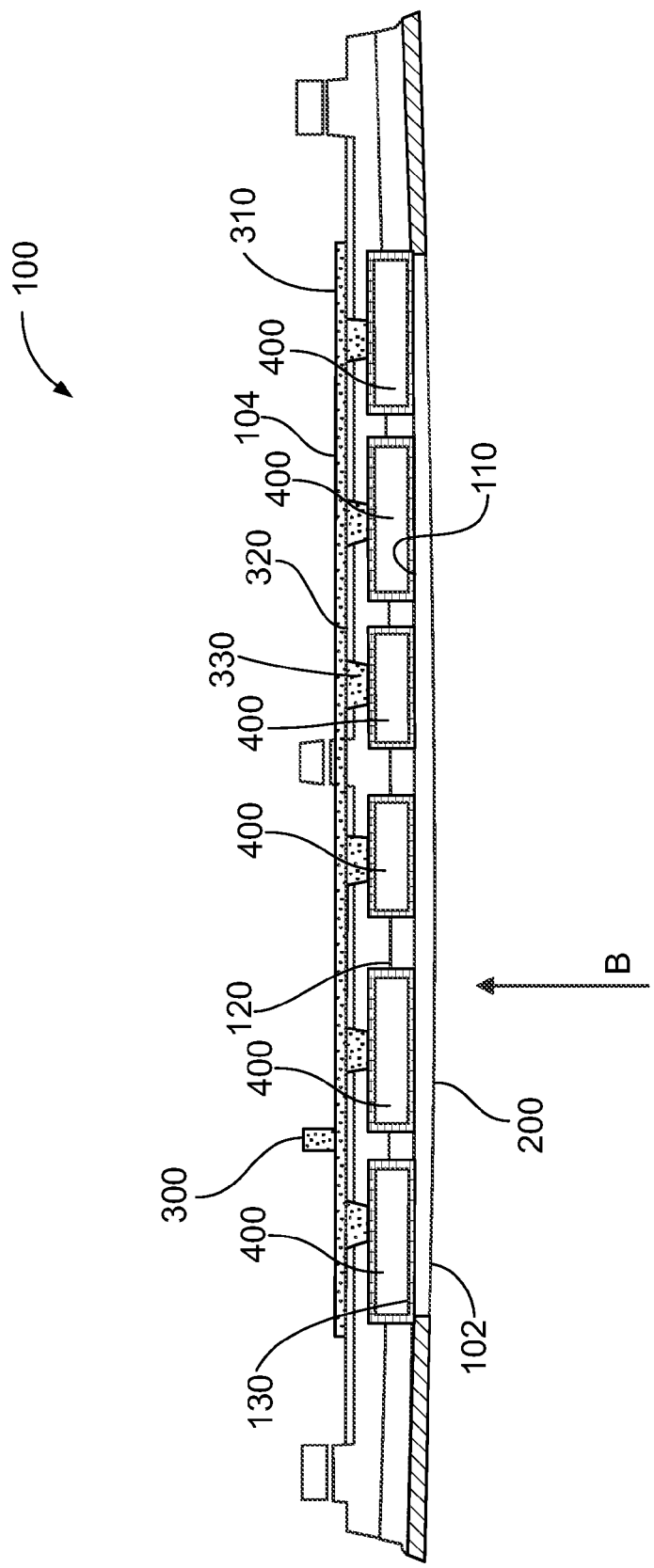
FIG. 3 depicts a cross sectional view of the appliance control panel of FIG. 2.

FIG. 3 depicts a cross sectional view of a control panel 100 viewed in the direction shown by cross section line A of FIG. 2. A user of the control panel looks in direction B (as shown in FIG. 3), such that exterior surface 102 is on the exterior of the appliance, for example, the outside of a refrigerator. The surface 102 may be comprised of, for example, a plastic material. In certain embodiments, the surface 102 may comprise a substrate that is capable of transmitting an electrical signal, for example, when touched by a user. The rear surface 104 of the control panel cannot be seen by a user in a normal operational state. Surface 102 comprises the control panel interface 200 having display 210, input interface 220 and one or more keys or switches for operating the control panel. For example, surface 102 may have a digital display 210 that depicts the mode and/or functions controlled by the panel.

A circuit board assembly such as a printed circuit board 310, or "PCB," is shown at the rear surface 104 of the control panel 100. The PCB 310 is used to mechanically support and electrically connect electronic components of the appliance and the control panel using conductive pathways, tracks or traces. A Printed Circuit Board Assembly 300, or "PCBA," comprises the PCB 310 as well as an input receptor panel 320. The input receptor panel 320 comprises one or more input receiver pads 330. The input receiver pads 330 receive signals from the keys of the control panel 100 and transmit those signals to the PCB 310.

Figure 4:
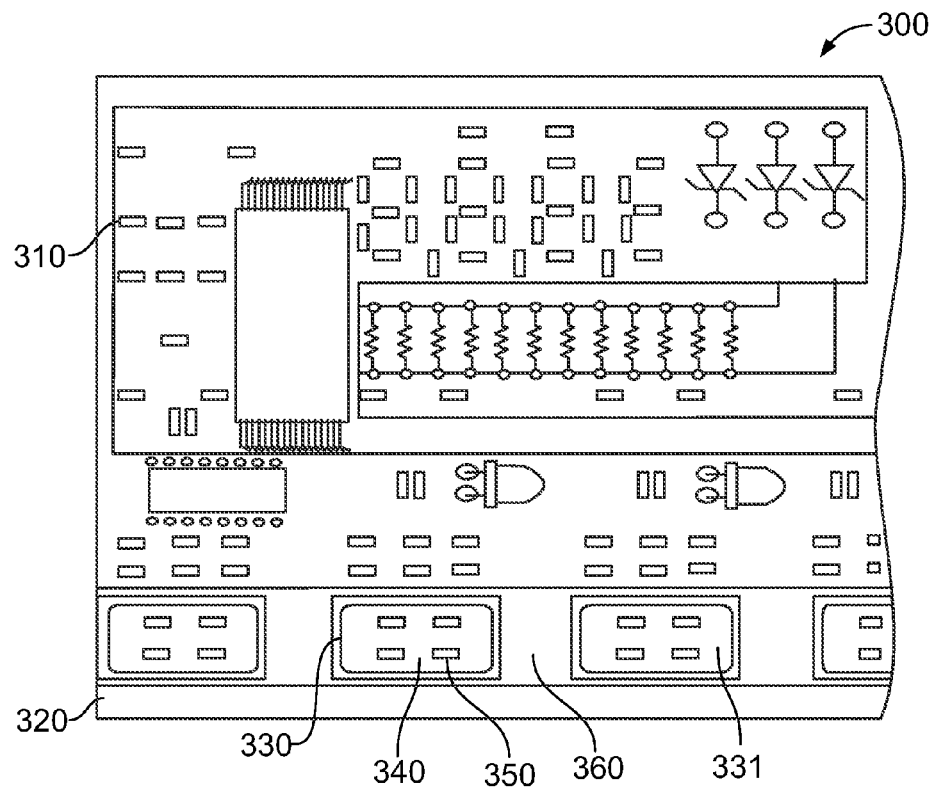
FIG. 4 depicts a portion of a circuit board assembly in accordance with an embodiment of the presently described technology.

FIG. 4 depicts a portion of a PCBA 300 in accordance with an embodiment of the presently described technology. The PCBA 300 comprises a PCB 310 having the necessary electronic circuitry and/or pathways to operate the control panel. The PCBA 300 of FIG. 4 is also shown having an input receptor panel 320 comprising multiple input receiver pads 330. The input receiver pads 330 of FIG. 4 comprises at least one conductive surface 340 and can be placed in closer proximity to each other than is depicted in FIG. 4, as discussed below.

As shown in FIG. 3, a gap 120 is shown between the interior surface 130 of the control panel interface 200 and the PCBA 300. A plurality of conductive extenders 400 are disposed between the control panel interface 200 and the PCBA 300 to transmit a signal between the interface 200 and the PCBA 300. For example, when the control panel 100 uses touch keys and a user selects a key 222 (for example, Temp) from the interface 200, the extenders 400 (which can be a conductive material such as a foam pad surrounded by a conductive fabric band, for example) transmit a capacitive or otherwise electronic signal to the PCBA 300. In certain embodiments the interior surface 130 of the interface 200 may comprise a metal plating 110. The metal plating 110 may be at a point of contact with the extender 400 to provide an improved electrical connection between the interface 200 and the extender 400. In certain embodiments of the presently described technology, the extenders 400 are comprised of a compressible material, such as foam, for example, so that they maintain their position and connectivity in the control panel 100 when the surface 102 of the control panel is compressed from being touched or pressed by a user.

FIG. 5 depicts a view of an extender 400 as it would be seen from a top view a control panel, such as that of FIG. 3. The extender (or extenders) 400 comprise a foam block 410 or a foam layer surrounded by one or more conductive bands 420 (depicted by the hatching pattern of FIG. 4). The conductive band 420 may be comprised of a metal, a conductive fabric, or other conductive material, such as a metal ribbon, for example. The conductive band 420 may surround the entirety of the foam block 410 or just a portion thereof as long as it is sufficient to transmit a signal between the interface 200 of the control panel 100 and the receiver pads 330 of the PCBA 300. Further, the conductive band 420 may extend across the entire surface of the foam block 410, or just a portion thereof. The foam block 410 may comprise an insulating or non-conductive material. In certain embodiments, the extenders 400 may be comprised of other materials, however, it is preferred that the extender 400 is comprised of a compressible material. For example, the extender 400 may be a spring, or may be comprised of a conductive rubber material, for example. The embodiment depicted in FIG. 5 depicts an extender 400 that is square in shape; however other shapes may be used. For example, the extender 400 may be rectangular or another shape (for example, a circle, oval, triangle, cylinder, sphere, pyramid), configured to fit into a location, or to mate with various surface (for example, the interior interface surface or the receiver pads of the PCBA) or shapes as needed.

FIG. 6 depicts a front view of extender 400 of FIG. 5 as it would be seen looking in the viewing direction B of FIG. 3. As shown in FIG. 6, the conductive band 420 covers the entire surface of the extender 400 so as to provide a greater contact surface area between the extender 400 and the portions of the interior surface 130 of the input interface 200 of the control panel 100 and the input receiver pad 330 of the PCBA 300 that is in contact with the extender 400. The ability of the extender 400 to compress provides adaptability for the control panel. Because the extender 400 is preferably in contact with both the PCBA 300 and the rear surface of the control panel interface 200 to provide an optimal connection, the extender 400 can compress when the surface is touched by a user. For example, in FIG. 3, the extenders 400 are shown compressed between the interface 200 and the PCBA 300. In certain embodiments, an adhesive is applied to either the extender 400 or the surface(s) to which the extender 400 is connected to ensure that the extender 400 maintains its position in the control panel 100.

The extender 400 transmits a signal that is capable of being received by the receiver pads 330 of the PCBA 300 when a user touches the touch pad while minimizing the amount of noise transmitted. A large amount of noise can result in false signals being generated, or can reduce the likelihood that an actual touch generates a proper signal. Certain embodiments of the presently described technology include extenders 400 that provide a minimum signal to noise ratio of about 6 to 1 for the control panel system 100. In certain embodiments the minimum signal to noise ratio of the system 100 can be about 8 to 1. In certain embodiments, other signal to noise ratios may also be sufficient, desirable or optimal for operation, depending on the needs and functions of the system.

The presently described technology describes touch keys for an electronic control (such as an appliance control panel), where the touch keys operate as multiple keys in one operation mode, and as a single key in another mode. For example, an appliance control panel 100, such as a refrigerator control panel may have a first operation input mode where a user may elect to dispense crushed or cubed ice. In such a mode, the presently described technology can provide a multi-function key (for example, Dispense type key 240 of FIGS. 2 and 8) that dispenses cubed ice when the user presses on the left key region 241 of the multi-function key 240, and crushed ice when the user presses on the right key region 243 of the multi-function key 240. In this mode the control panel may offer no function if a user presses in the middle key region 242 of the multi-function key, or alternatively, the control panel may provide a third function if a user presses in the middle key region 242. For example, the control panel 100 may execute a dispensing of water when a user presses the middle key region 242. In a second mode, the multi-function key 240 can provide a single function independent on the location of the press on the key. For example, in a second mode, the multi-function key 240 may turn on the refrigerator light for a press anywhere on the key.

Figure 7:
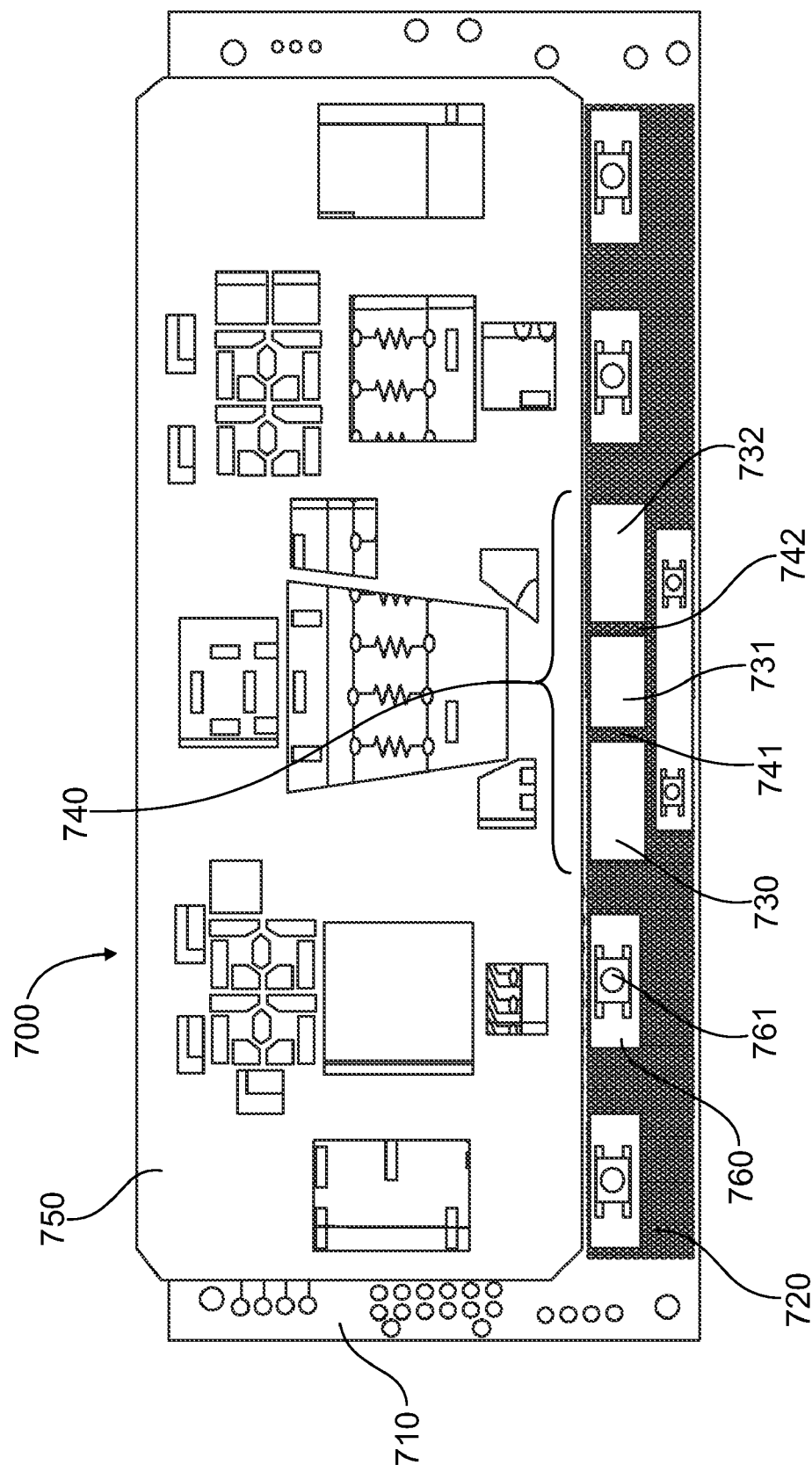
FIG. 7 depicts the circuit board assembly of FIG. 3 modified in accordance with an embodiment of the presently described technology.

The input receiver pads 330 of FIG. 4 are depicted as being spaced relatively far apart, such that a user pressing the region 360 between receiver pads 330 and 331 may not be detected as a key press. In one aspect of the presently described technology, a PCBA 700 is provided having receiver input pads 730, 731 and 732 as depicted in FIG. 7. FIG. 7 depicts a PCBA 700 having a PCB 710 and a receiver input panel 720. FIG. 7 also depicts a spacer 750 which can provide support and structure the control panel interface including a display unit. Receiver pads 730, 731 and 732 are depicted being much closer together than the receiver pads 330 and 331 of FIG. 4. A user press on the input interface 200 anywhere above (i.e., in front of) the region 740 will register as a touch of at least one of the receiver pads 730, 731 or 732. An extender 400, such as extender 400 depicted in FIGS. 5 and 6 may provide a connection between the control panel interface 200 and the PCBA 700. The extenders 400 may have a flat surface to provide a good connection between the control panel interface 200 and the receiver pads 730, 731 and 732.

The control panel 100 is capable of sensing a fraction of a user's finger that is causing a change in the capacitance of the system. Accordingly, the control panel 100 can determine which control panel functionality to execute based on receiver pad that is deemed to have been activated. For example, the sensitivity of the receiver pads is such that a press of the input interface 200 above the region 741 between receiver pads 730 and 731 will be detected, at least partially, by both receiver pads 730 and 731. An algorithm in the control module may register a press of one key if more than 50% of the finger is detected above (i.e., in front of) that region in one mode, for example. In another mode, the control module may read all receiver pads 730, 731 and 732 as a unified receiver pad, such that a press of key 730, 731 or 732, or a press in the regions between the pads, 741 or 742 result in a press of the unified receiver pad.

Receiver pad 760 is depicted having a tactile switch 761 mounted thereon. In certain embodiments, receiver pads 730, 731 and 732 may be configured to operate with a tactile switch 761. For example, the receiver pads may have tactile switch soldering pads disposed on the receiver pad, to allow a tactile switch 761 to be connected to the receiver pad. The receiver pad 760 may have soldering pads for connecting to a tactile switch 761 such that the same PCBA can be used for both tactile switch control panels and touch panels. Such an embodiment allows the PCBA 700 to be operable with appliances incorporating either a touch control panel or a tactile control panel. This interchangeability can be desirable where a particular appliance is offered in product lines having both a tactile and a touch control panel, because the same circuit board assembly can be used for each product line.

The control panel 100 has an operation module (not shown), such as a processor or a computer that is capable of operating and executing software. The operation module can govern the display of the control panel and regulate the function of the keys among the various modes. Refer again to FIG. 2, which depicts an embodiment of the interface 200 in a particular operation mode, for example, a temperature adjust operation mode. Dispense Type key 240 is a multi-function key. In the operation mode provided in the depicted embodiment, a press of the left key region 241 will result in a lowering of the temperature of the appliance, as indicated by the minus sign indicator above that portion of key in the mode display area 250. A press of the right key region 243 will result in a raising of the temperature of the appliance, as indicated by the plus sign indicator above that portion of the key in the mode display region 250. A press of the Options key 224 will result in a toggle between Fahrenheit and Celsius as the temperature scale used for the adjustment, as indicated by the "° C./° F." in the region 255 above the Options key 224. A press in the middle key region 242 may not result in any function, or a press of the middle key region 242 can result in an alternative function, for example, to hold the temperature. Alternatively, the control panel may detect whether the press was closer to the left key region 241 or the middle key region 242, and execute the function accordingly.

Figure 8:
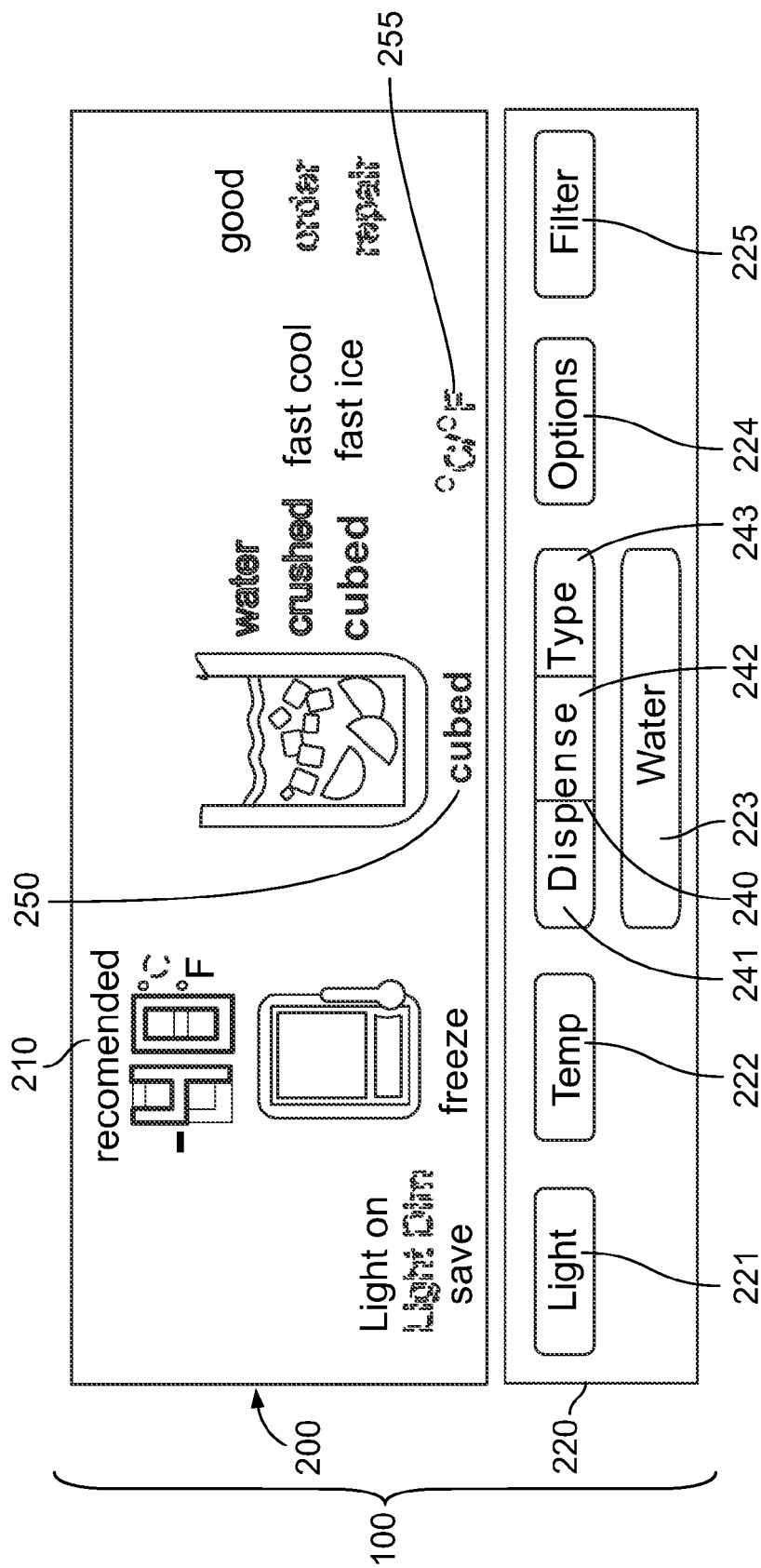
FIG. 8 depicts an example of the interface of FIG. 2 in a certain (i.e., a second) operation input mode in accordance with an embodiment of the presently described technology.

FIG. 8 depicts an embodiment of the control panel interface of FIG. 2 in a different operation mode, for example, a dispensing operation mode. In the operation mode depicted by FIG. 8, a press of the Dispense Type key 240 will result in a change of the type of product that is dispensed from the dispenser when the Water key 223 is pressed. In the depicted embodiment, a press of the water key 223 will result in a dispensing of cubed ice. A press of the Dispense Type Key 240 (regardless of whether the press is in the left key region 241, the right key region 243 or the middle key region 242) will cycle through the three types of products (water, crushed ice and cubed ice) that will be dispensed by a press of the Water key 223. In this mode, there is no information in the region 255 above the Options key 224 indicating that a press of that key may not have a function in this operation mode.

Certain embodiments of the presently described technology provide systems and methods for providing a control panel system 100. The control panel system 100 has an interface 200 which has at least one multi-function key 240. The control panel system 100 also comprises a circuit board assembly 700, such as a PCBA having a receiver input panel 720 with receiver pads 730, 731 and 732. In other embodiments, the receiver input panel 720 and/or the circuit board assembly 700 is not in direct contact with the control panel interface 200. Where the control panel interface 200 and the circuit board assembly 700 are not in direct connection, an electrical connection or electrical continuity between them can be maintained by the use of extenders 400, such as those depicted in FIGS. 5 and 6. The multi-function key 240 has a plurality of regions as shown by the regions 241, 242 and 243 of the Dispense Type key 240 of FIGS. 2 and 8. The key regions 241, 242 and 243 may be capacitive touch keys, for example. The regions may correspond to receiver pad areas as depicted by receiver pads 730, 731 and 732 in FIG. 7. The control panel system 100 also has an operation module that regulates the control panel system 100 between multiple operation input modes. The operation input modes may comprise a first operation input mode and a second operation input mode, as depicted by FIG. 2 and FIG. 8. When the control panel 100 is in a first operation input mode, the activation of each key region 241, 242 or 243 results in the execution of a separate appliance function, as in the embodiment depicted by FIG. 2. When the control panel 100 is in a second operation input mode, the activation of each key region 241, 242 or 243 executes the same function as in the embodiment depicted by FIG. 8. In certain embodiments, a user press between two key regions is detected as an activation of at least one of those regions. In other embodiments, the control panel system 100 may have a display 210. The display may use indicators (such as the plus or minus sign indicators in area 250 of FIG. 2) relative to the key regions 241, 242 or 243 to provide information to the user about the operation of the various key regions. In further embodiments of the presently described technology, a separate indicator may be displayed above each key region.

In certain embodiments, the multi-function keys 240 may have more than two key regions. For example, three, four or five or more key regions can be implemented in a multi-function key 240. Each of the key regions is capable of activating a separate appliance function when activated in a certain operation input mode. In other operation input modes, the key regions may offer the same functionality as one or more other key regions when activated by a user. Certain embodiments of the presently described technology provide a control panel system 100 having more than one multi-function key 240.

Certain embodiments provide methods for operating an appliance control panel system 100. The method provides a control panel interface 200 with a multi-function key 240 or keys. The multi-function keys 240 can be capacitive touch keys, for example. The multi-function keys 240, as described above, have a plurality of key regions 241, 242 and 243. The method also provides a control panel operation module that regulates the control panel 100 among two or more operation input modes. The method involves executing appliance functions when the various key regions 241, 242 and 243 of the multi-function key 240 are activated. When the control panel system 100 is in the first operation mode, the activation of each key region executes a separate appliance function. When the control panel system 100 is in another operation mode, the activation of each key region 241, 242 or 243 executes the same appliance function. In certain embodiments, a user press between two key regions (for example, the region on the interface above or in front of area 741) is detected as an activation of at least one of those regions (for example, the region on the interface above or in front of receiver pad 730). The method may also provide a display unit 210 positioned operatively relative to the control panel interface 200, such that the display 210 is capable of providing indicators relative to the control panel input interface 220. The indicators, such as those depicted by the plus and minus sign in area 250 of FIG. 2, provide an indication of the operation input mode that the control panel system 100 is in, and the functionality provided by the various key regions 241, 242 and 243 of the multi-function keys 240 in that mode. In certain embodiments the method provides multi-function keys 240 having more than two key regions. For example, three, four or five or more key regions can be implemented in a multi-function key 240. Each of the key regions is capable of activating a separate appliance function when activated in a certain operation input mode. In other operation input modes, the key regions may offer the same functionality as one or more other key regions when activated by a user. Certain embodiments of the presently described technology provide a control panel system having more than one multi-function key 240. In certain embodiments, the circuit board assembly 700 of the control panel system may not be in direct contact with the control panel interface 200, therefore the method can further provide a plurality of extenders 400 between the control panel interface 200 and the circuit board assembly 700, providing an electrical connection therebetween.

In certain embodiments, an appliance control panel system 100 is provided. The control panel system 100 has an interface having at least one multi-function key 240. The control panel system 100 also has an operation module for regulating the system between multiple input modes. In a first input mode, the operation module interprets a signal that indicates a press of a first key region 241 of the multi-function key 240 as a first key press, and a press of a second key region 242 as a second key press. In a second operation mode, the operation module interprets a signal that indicates a user has pressed the either the first key region 241, the second key region 242 or in between the two regions (for example, the region on the interface above or in front of area 741) as a press of a single key.

Figure 1:
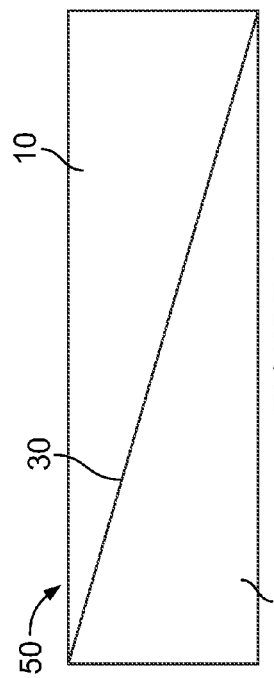
FIG. 1 depicts an exemplary embodiment of a slider capacitive touch pad.

The presently described technology offers improvements over the slider touch pads in the art, such as those disclosed in FIG. 1. The slider touch pads require more complicated software due to the complex geometry and the precision of location to be determined. The presently described technology provides a simplified system for determining the general location of a key press, which is useful for certain appliance control panels. Further, the systems and methods of the presently described technology are of a lower cost to implement than slider systems since it uses less software resources. Further, the systems and methods described herein provide a way to detect the location of a press on a multi-function key that is operable in control panel systems that are required to work with extenders to span a gap between the control panel interface and the circuit board assembly.

The presently described technology has now been described in such full, clear, concise and exact terms as to enable any person skilled in the art to which it pertains, to practice the same. It is to be understood that the foregoing describes preferred embodiments and examples of the presently described technology and that modifications may be made therein without departing from the spirit or scope of the invention as set forth in the claims. Moreover, while particular elements, embodiments and applications of the presently described technology have been shown and described, it will be understood, of course, that the presently described technology is not limited thereto since modifications can be made by those skilled in the art without departing from the scope of the present disclosure, particularly in light of the foregoing teachings and appended claims. Moreover, it is also understood that the embodiments shown in the drawings, if any, and as described above are merely for illustrative purposes and not intended to limit the scope of the invention, which is defined by the following claims as interpreted according to the principles of patent law, including the Doctrine of Equivalents. Further, all references cited herein are incorporated in their entirety.

The invention claimed is:

1. An appliance control panel system comprising:
   a control panel interface having at least one multi-function key, said at least one multi- function key having a plurality of key regions, said plurality of key regions having a first key region and a second key region; and
   a control panel operation module for regulating said control panel system between a plurality of operation input modes, said operation input modes comprising at least a first operation input mode and a second operation input mode;

wherein, when said control panel system is in said first operation input mode, activation of said first key region executes a first appliance function, and activation of said second key region executes a second appliance function, and when said control panel system is in said second operation input mode, activation of said first key region and activation of said second key region execute the same appliance function.

2. The appliance control panel system of claim 1, further comprising a display unit, said display unit positioned operatively relative to said control panel interface, wherein, when said control panel system is in said first operation input mode, said display unit displays a first indicator relative to said first key region and a second indicator relative to said second key region.

3. The appliance control panel system of claim 2, wherein said display unit is positioned above said control panel interface, and said first indicator is displayed above said first key region and said second indicator is displayed above said second key region.

4. The appliance control panel system of claim 1, wherein said first key region and said second key region comprise a capacitive touch key.

5. The appliance control panel system of claim 4, wherein said first key region and said second key region are positioned relative to each other such that, when said control panel system is in said second operation input mode, a user press between said first key region and said second key region is detected as an activation of at least one of said first key region and said second key region.

6. The appliance control panel system of claim 1, said multi-function key having a third key region, wherein, when said control panel system is in said first operation input mode, activation of said third key region executes a third appliance function, and when said control panel system is in said second operation input mode, activation of said first key region, activation of said second key region and activation of said third key region execute the same appliance function.

7. The appliance control panel system of claim 6, wherein said plurality of operation input modes comprises a third operation input mode, wherein, when said control panel system is in said third operation input mode, activation of said first key region executes a first appliance function, and activation of said second key region and activation of said third key region execute a second appliance function.

8. The appliance control panel system of claim 1, wherein said control panel interface has at least two multi-function keys, said at least two multi-function keys each having at least a first key region and a second key region.

9. The appliance control panel system of claim 1, further comprising a circuit board assembly wherein said control panel interface is not in direct contact with said circuit board assembly.

10. The appliance control panel system of claim 9, further comprising a plurality of conductive extenders, said extenders being situated between said control panel interface and said circuit board assembly, and wherein said first key region is in electrical connection with said circuit board assembly via a first conductive extender and said second key region is in electrical connection with said circuit board assembly via a second conductive extender.

11. A method for operating an appliance control panel system comprising the steps:

providing a control panel interface having at least one multi-function key, said at least one multi-function key having a plurality of key regions, said plurality of key regions comprising a first key region and a second key region;

providing a control panel operation module regulating among a plurality of operation input modes, said operation input modes comprising at least a first operation input mode and a second operation input mode; and executing an appliance function when at least one of said first key region and said second key region is activated;

wherein, when said control panel system is in said first operation input mode, activation of said first key region executes a first appliance function, and activation of said second key region executes a second appliance function, and when said control panel system is in said second operation input mode, activation of said first key region of said multi-function key and activation of said second region of said multi-function key execute the same appliance function.

12. The method of claim 11, further comprising providing a display unit positioned operatively relative to said control panel interface.

13. The method of claim 12, further comprising the step of displaying, via the display unit, at least one indicator relative to said first region of said multi-function key and at least one indicator relative to said second region of said multi-function key when said control panel system is in said first operation mode.

14. The method of claim 11, wherein said multi-function key has a third key region, and when said control panel system is in said first operation input mode, activation of said third key region executes a third appliance function, and when said control panel system is in said second operation input mode, activation of said first key region, activation of said second key region and activation of said third key region of said multi-function key execute the same appliance function.

15. The method of claim 14, wherein said plurality of operation input modes comprises a third operation input mode, wherein, when said control panel system is in said third operation input mode, activation of said first key region executes a first appliance function, and activation of said second key region and activation of said third key region execute a second appliance function.

16. The method of claim 11, wherein said first key region and said second key region comprise a capacitive touch key.

17. The method of claim 16, wherein said first key region and said second key region are positioned relative to each other such that, when said control panel system is in said second operation input mode, a user press between said first key region and said second key region is detected as an activation of at least one of said first key region and said second key region.

18. The method of claim 11, further comprising:

providing a circuit board assembly wherein said control panel interface is not in direct contact with said circuit board assembly; and providing a plurality of conductive extenders, said extenders being situated between said control panel interface and said circuit board assembly, and said first key region and said second key region is in electrical connection with said circuit board assembly.

19. An appliance control panel system comprising:

a control panel interface having at least one multi-function key, said at least one multi-function key having a plurality of key regions, said plurality of key regions having a first key region and a second key region; and a control panel operation module for regulating said control panel system between a plurality of operation input modes, said operation input modes comprising at least a first operation input mode and a second operation input mode;

wherein, in said first operation input mode, said control panel operation module interprets a signal indicating a user press of said first key region as a first key press and a signal indicating a press of said second key region as a second key press, and in said second operation input mode, said control panel operation module interprets a signal indicating a user press of said first key region and a press of said second key region as a third key press.

20. The appliance control panel system of claim 19, wherein, in said second operation input mode, said control panel operation module interprets a signal indicating a user press in between said first key region and said second key region as as said third key press.

* * * * *